United States Patent
Kim et al.

(10) Patent No.: US 10,809,550 B2
(45) Date of Patent: Oct. 20, 2020

(54) LIQUID CRYSTAL DISPLAY DEVICE INCLUDING FIRST AND SECOND LIGHT BLOCKING UNITS

(71) Applicant: Samsung Display Co., Ltd., Yongin, Gyeonggi-Do (KR)

(72) Inventors: Young Gu Kim, Suwon-si (KR); Hyun Ku Ahn, Hwaseong-si (KR); Baek Kyun Jeon, Yongin-si (KR); Jae Weon Hur, Busan (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 204 days.

(21) Appl. No.: 14/993,179

(22) Filed: Jan. 12, 2016

(65) Prior Publication Data
US 2017/0090223 A1   Mar. 30, 2017

(30) Foreign Application Priority Data
Sep. 25, 2015 (KR) .......... 10-2015-0136426

(51) Int. Cl.
*G02F 1/13* (2006.01)
*G02F 1/1335* (2006.01)
*G02B 5/20* (2006.01)
*G02B 5/22* (2006.01)

(52) U.S. Cl.
CPC .......... *G02F 1/1309* (2013.01); *G02B 5/208* (2013.01); *G02B 5/223* (2013.01); *G02F 1/133512* (2013.01); *G02F 1/133514* (2013.01); *G02F 2001/133519* (2013.01)

(58) Field of Classification Search
CPC combination set(s) only.
See application file for complete search history.

(56) References Cited

U.S. PATENT DOCUMENTS

| | | | |
|---|---|---|---|
| 8,628,637 B2 | 1/2014 | Ishii et al. | |
| 8,873,006 B2 | 10/2014 | Kunimatsu et al. | |
| 2002/0085149 A1* | 7/2002 | Kim | G02F 1/133512 349/110 |
| 2008/0088788 A1* | 4/2008 | Cho | G02F 1/133514 349/160 |
| 2010/0033657 A1* | 2/2010 | Choi | G02F 1/13378 349/104 |
| 2011/0063535 A1* | 3/2011 | Chang | G02F 1/133512 349/37 |
| 2012/0224114 A1* | 9/2012 | Kunimatsu | G02F 1/133345 349/42 |
| 2012/0249940 A1* | 10/2012 | Choi | G02F 1/133753 349/123 |
| 2012/0268702 A1 | 10/2012 | Imanishi et al. | |

(Continued)

*Primary Examiner* — Lauren Nguyen
(74) *Attorney, Agent, or Firm* — Cantor Colburn LLP

(57) ABSTRACT

A method of repairing a liquid crystal display device, the method including, providing a liquid crystal display device including a substrate, a light blocking member disposed on the substrate, and an overcoat layer which is disposed on the substrate and the light blocking member and which contains a material capable of absorbing ultraviolet light having a wavelength range from 200 nanometers to 400 nanometers; and irradiating the overcoat layer with a laser beam having a wavelength range from 200 nanometers to 400 nanometers to form a microcavity between the substrate and the overcoat layer to repair the liquid crystal display.

7 Claims, 17 Drawing Sheets

(56) References Cited

U.S. PATENT DOCUMENTS

2013/0162926 A1 6/2013 Kwack et al.
2015/0062520 A1* 3/2015 Matsumori ....... G02F 1/133723
 349/135

* cited by examiner

LIQUID CRYSTAL DISPLAY DEVICE INCLUDING FIRST AND SECOND LIGHT BLOCKING UNITS

CROSS-REFERENCE TO RELATED APPLICATION

This application claims priority to Korean Patent Application No. 10-2015-0136426, filed on Sep. 25, 2015, in the Korean Intellectual Property Office, and all the benefits accruing therefrom under 35 U.S.C. § 119, the content of which is incorporated herein by reference in its entirety.

BACKGROUND

1. Technical Field

This disclosure relates to a liquid crystal display device and a repairing method thereof.

2. Description of the Related Art

A liquid crystal display device is one of the currently most widely used flat panel display devices, and can include two substrates having electric field generating electrodes such as pixel electrodes, a common electrode and the like formed thereon, and a liquid crystal layer interposed between the substrates.

A liquid crystal display is configured to provide a voltage applied to the electrodes so as to generate an electric field in the liquid crystal layer, which determines the alignment direction of liquid crystal molecules in the liquid crystal layer to control the polarization of incident light, thereby displaying a desired image.

When a liquid crystal display device is analyzed in a display quality test after being manufactured, hot pixel defects or dead pixel defects may be found in which pixels are always turned on or off due to defects in a conductive pattern, defects in a liquid crystal layer, or the like. Thus there is a need for a method to repair defective pixels.

SUMMARY

Disclosed is a method or repairing a liquid crystal display device capable of repairing hot pixel defects.

The disclosed method of repairing a liquid crystal display device that can avoid additional defects caused by a repairing process.

Also disclosed is a liquid crystal display device in which hot pixel defects are effectively repaired to provide improved display quality.

According to an aspect, there is provided a method of repairing a liquid crystal display device, the method including: providing a liquid crystal display device including a substrate, a light blocking member disposed on the substrate, and an overcoat layer which is disposed on the substrate and the light blocking member and which contains a material capable of absorbing ultraviolet light of a wavelength range from 200 nanometers to 400 nanometers; and irradiating the overcoat layer with a laser beam having a wavelength range from 200 nanometers to 400 nanometers to form a microcavity between the substrate and the overcoat layer to repair the liquid crystal display.

In an exemplary embodiment, the method may further comprise, after the irradiating the overcoat layer, a second laser beam irradiating step of irradiating a laser beam on the light blocking member on the substrate so as to process the light blocking member.

In an exemplary embodiments the method may further comprise, after the second laser beam irradiating step, a third laser beam irradiating step of diffusing light blocking member particles generated by processing the light blocking member into the microcavity.

In an exemplary embodiment, the third laser beam irradiating step may include irradiating the laser beam from the light blocking member toward the microcavity adjacent to the light blocking member in a scanning manner.

In an exemplary embodiment, the laser beam may have a pulse width of 450 ps to 550 ps.

In an exemplary embodiment, the material capable of absorbing ultraviolet light of a wavelength range from 200 nm to 400 nm may include a conjugated compound, an allene-based compound, an alkyne-based compound, a thioether group-containing compound, a carbonyl-based compound, an ester group-containing compound, an imine group-containing compound, an azo-based compound, a nitroso group-containing compound, a ketene-based compound, or a combination thereof.

According to an aspect, there is provided a liquid crystal display device including: a substrate; a first light blocking unit disposed on the substrate so as to divide a plurality of pixel regions including a first pixel region and a second pixel region; a color filter disposed in the first pixel region and on the substrate; and an overcoat layer which is disposed on the substrate, the first light blocking unit, and the color filter, and which includes a material which is capable of absorbing ultraviolet light of a wavelength range from 200 nanometers to 400 nanometers.

In an exemplary embodiment, the material capable of absorbing ultraviolet light of a wavelength range from 200 nm to 400 nm may include a conjugated compound, an allene-based compound, an alkyne-based compound, a thioether group-containing compound, a carbonyl-based compound, an ester group-containing compound, an imine group-containing compound, an azo-based compound, a nitroso group-containing compound, a ketene-based compound, or a combination thereof.

In an exemplary embodiment, the material capable of absorbing ultraviolet light of a wavelength range from 200 nm to 400 nm may be contained in an overcoat composition for forming the overcoat layer in a range of 0.001 weight percent (wt %) to 10.0 wt %.

In an exemplary embodiment, the liquid crystal display device may further comprise a microcavity formed to be overlapped with at least a part of the second pixel region and formed between the substrate and the overcoat layer.

In an exemplary embodiment, the liquid crystal display device may further comprise a second light blocking unit formed in the microcavity without a physical boundary with the first light blocking unit adjacent to the second light blocking unit.

According to another aspect, there is provided a liquid crystal display device including: a first substrate; a first light blocking unit disposed on the first substrate so as to divide a plurality of pixel regions; and an organic layer which is disposed on the first substrate and the first light blocking unit, and which includes a material which is capable of absorbing ultraviolet light of a wavelength range from 200 nm to 400 nm.

In an exemplary embodiment, the liquid crystal display device may further include a color filter disposed on the organic layer.

In an exemplary embodiment, the liquid crystal display device may further include a microcavity formed which is overlapped with at least a part of the color filter and formed between the first substrate and the organic layer.

In an exemplary embodiment, the liquid crystal display device may further include a second light blocking unit formed in the microcavity without a physical boundary with the first light blocking unit adjacent to the second light blocking unit.

In an exemplary embodiment, the liquid crystal display device may further include: a second substrate facing the first substrate with a space therebetween; and a color filter disposed on the second substrate.

In an exemplary embodiment, the liquid crystal display device may further include a microcavity formed to be overlapped with at least a part of the color filter and formed between the first substrate and the organic layer.

In an exemplary embodiment, the liquid crystal display device may further include a second light blocking unit formed in the microcavity without a physical boundary with the first light blocking unit adjacent to the second light blocking unit.

In an exemplary embodiment, the material capable of absorbing ultraviolet light of a wavelength range from 200 nm to 400 nm may include a conjugated compound, an allene-based compound, an alkyne-based compound, a thio-ether group-containing compound, a carbonyl-based compound, an ester group-containing compound, an imine group-containing compound, an azo-based compound, a nitroso group-containing compound, a ketene-based compound, or a combination thereof.

In an exemplary embodiment, the material capable of absorbing ultraviolet light of a wavelength range from 200 nm to 400 nm may be contained in an organic layer composition for forming the organic layer in a range of 0.001 wt % to 10 wt %.

The method or repairing a liquid crystal display device forms a microcavity in the overcoat layer of a pixel region of the pixel in which a hot pixel defect has occurred and fills the microcavity with a light blocking material so as to effectively block a light path.

Furthermore, since the wavelength of the laser beam used in a repairing process does not vary depending on the color represented by a pixel region, repairing facilities can be unified, processability can be improved, and the production yield rate of a liquid crystal display device can be improved.

Furthermore, foreign substances may not be generated during a repairing process, thereby achieving in-advance prevention against problems in which the foreign substances are introduced into the liquid crystal layer.

In the liquid crystal display device hot pixel defects are effectively repaired to achieve improved display quality.

However, effects of the disclosed method are not restricted to the exemplary embodiments set forth herein and more diverse effects are included in this description.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
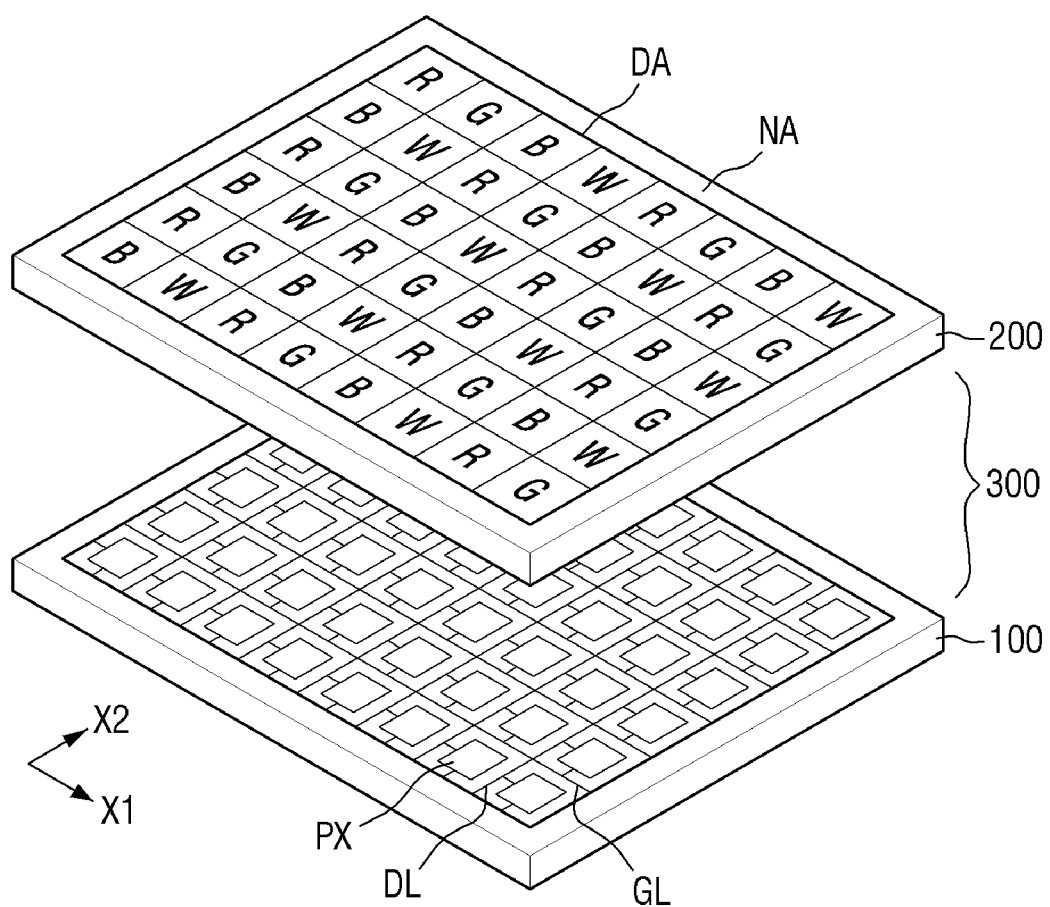
FIG. 1 is an exploded perspective view of an embodiment of a liquid crystal display device.

Features of the inventive concept and methods of accomplishing the same may be understood more readily by reference to the following detailed description of preferred embodiments and the accompanying drawings.

The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer, or intervening elements or layers may be present therebetween. In contrast, when an element is referred to as being "directly on," "directly connected to" or "directly coupled to" another element or layer, there are no intervening elements or layers present. As used herein, "connected" refers to elements being physically, electrically and/or fluidly connected to each other.

Like numbers refer to like elements throughout. As used herein, the term "and/or" includes any and all combinations of one or more of the associated listed items. "Or" means "and/or."

It will be understood that, although the terms "first," "second," "third," etc., may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, a "first element," "component," "region," "layer," or "section" discussed below could be termed a second element, component, region, layer, or section without departing from the teachings of the invention.

Spatially relative terms, such as "below," "lower," "bottom," "under," "above," "top," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Allene" means a $C_3$ to $C_{30}$ hydrocarbon having two double bonds, e.g., propadiene ($CH_2$=C=$CH_2$).

"Alkyne" means a straight or branched chain $C_2$ to $C_{30}$ hydrocarbon having at least one carbon-carbon triple bond.

"Ketene" means a compound of the formula R'R"C=C=O, wherein R' and R" are each independently hydrogen or a $C_1$ to $C_{30}$ hydrocarbon.

"Aldoketene" means a ketene wherein R" is H to provide a compound of the formula R'CH=C=O.

"Ketoketene" means a ketene wherein R' and R" are each independently a $C_1$ to $C_{30}$ hydrocarbon.

Degradation of display quality caused by hot pixel defects can be minimized by a repair process for blackening defective pixels. Methods for blackening defective pixels include cutting a part of a wiring unit by a laser beam or carbonizing a base substrate, an organic layer or the like of a liquid crystal display device.

A method of repair is to cut a part of a wiring unit with a laser beam. However, cutting a part of a wiring unit with a laser beam not only may have a low success rate but also may not be widely applied since such a cutting method can be performed only on pixel defects caused by short circuit. In addition, carbonizing a base substrate, an organic layer or the like may cause damage in a component (for example, an alignment layer) of a liquid crystal display device, thereby generating foreign substances or lowering alignment force, leading to additional defects such as light leakage defects or after image defects.

Disclosed is a method or repairing a liquid crystal display device, which will now be more fully described with reference to the attached drawings.

FIG. 1 is an exploded perspective view of an embodiment of a liquid crystal display device.

Referring to FIG. 1, a liquid crystal display device according to an embodiment of the present inventive concept may include a first substrate 100, a second substrate 200 facing and spaced apart from first substrate 100, and a liquid crystal layer 300 interposed between the first substrate 100 and the second substrate 200. The first substrate 100 may be a lower substrate and the second substrate 200 may be an upper substrate.

Each of the first substrate 100 and the second substrate 200 may include a display area DA and a non-display area NA. The display area DA is an area where an image is visible and the non-display area NA is an area where an image is not visible. The display area DA has an outer periphery enclosed with the non-display area NA.

The display area DA may include a plurality of gate lines GLs extending in a first direction X1 (e.g., column direction), a plurality of data lines DL extending in a second direction X2 (e.g., row direction) intersecting the first direction X1, and a plurality of pixel regions PX formed in the respective regions where the gate lines GL and the data lines DL intersect each other. The plurality of pixel regions PX may be arranged in the first direction X1 and the second direction X2, substantially forming a matrix.

Each pixel region PX may uniquely represent one of primary colors so as to implement color display. Examples of the primary colors may include red, green, blue and white colors. Throughout the specification, the pixel region representing a red color will be referred to as a red pixel R, the pixel region representing a green color will be referred to as a green pixel G, the pixel region representing a blue color will be referred to as a blue pixel B, and the pixel region representing a white color will be referred to as a white pixel W.

The liquid crystal display device according to an embodiment of the present inventive concept may include a red pixel R, a green pixel G, a blue pixel B and a white pixel W. Specifically, as shown in FIG. 1, the basic unit constituted by the red pixel R, the green pixel G, the blue pixel B and the white pixel W may be repeatedly arranged in the first direction (e.g., row direction) such that the basic unit of the red pixel R and the blue pixel B may be repeatedly arranged in the second direction (column direction) so as to constitute odd-numbered rows and the basic unit of the green pixel G and the white pixel W may be repeatedly arranged in the second direction (column direction) so as to constitute even-numbered rows. The red pixel R, the green pixel G, the blue pixel B and the white pixel W may be arranged into a 2×2 arrangement so as to form a single dot, but the present disclosure is not limited thereto, and various RGBW arrangements can be adopted.

The non-display area NA may be a light blocking area. A driving unit (not shown) which provides a gate driving signal, a data driving signal and the like to pixels in the display area DA may be disposed in the non-display area NA of the first substrate 100. The gate lines GL and the data lines DL may extend from the display area DA to the non-display area NA so as to be electrically connected to the driving unit (not shown).

The liquid crystal layer 300 may be interposed between the first substrate 100 and the second substrate 200. The liquid crystal layer 300 may include liquid crystal molecules having positive dielectric anisotropy, but the present disclosure is not limited thereto, and the liquid crystal layer 300 may include liquid crystal molecules having negative dielectric anisotropy.

An embodiment of a pixel region of the liquid crystal display device will hereinafter be explained in further detail.

Figure 2:
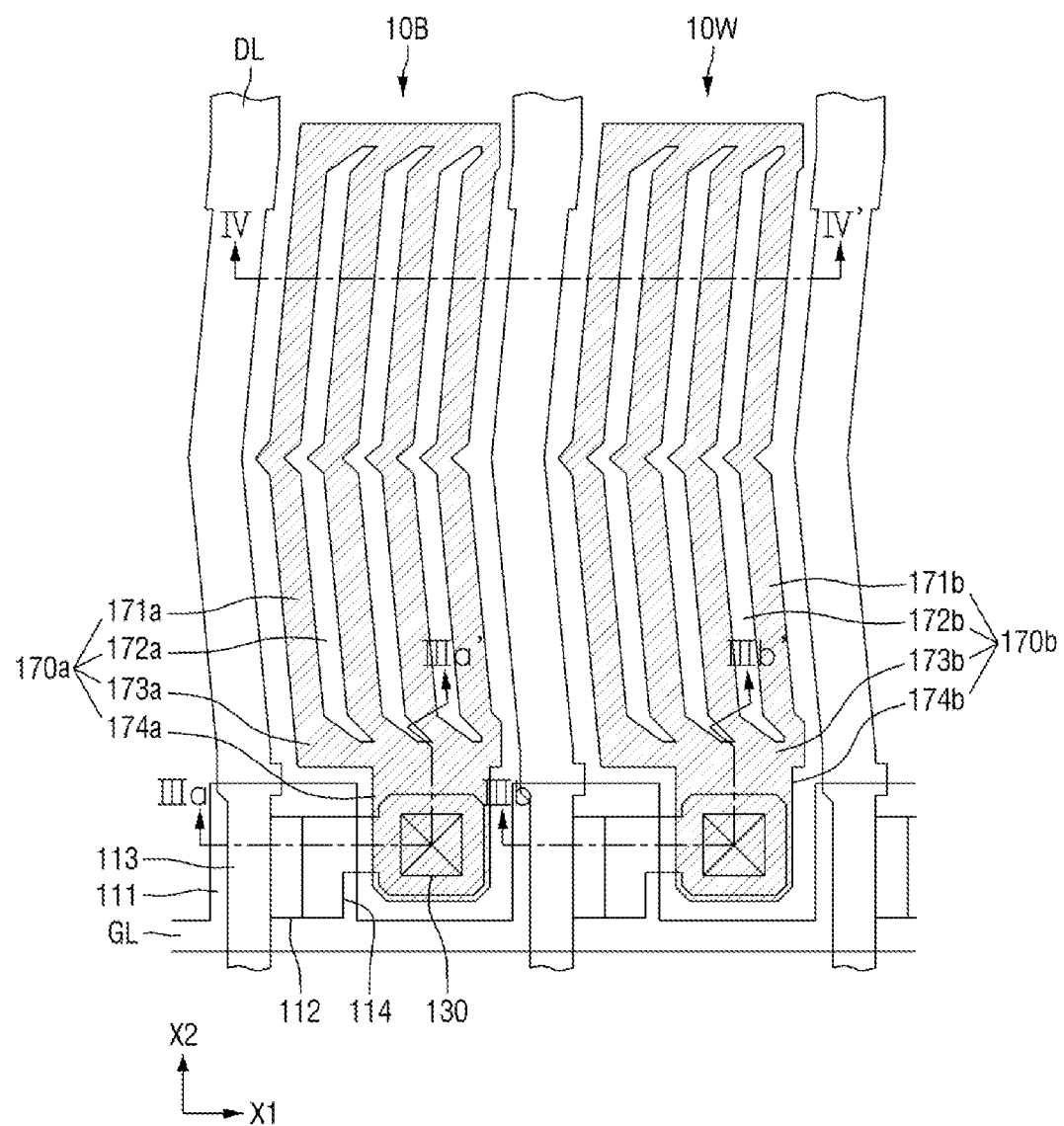
FIG. 2 is a plan view of an embodiment of certain pixels of the liquid crystal display device of FIG. 1.
Figure 3:
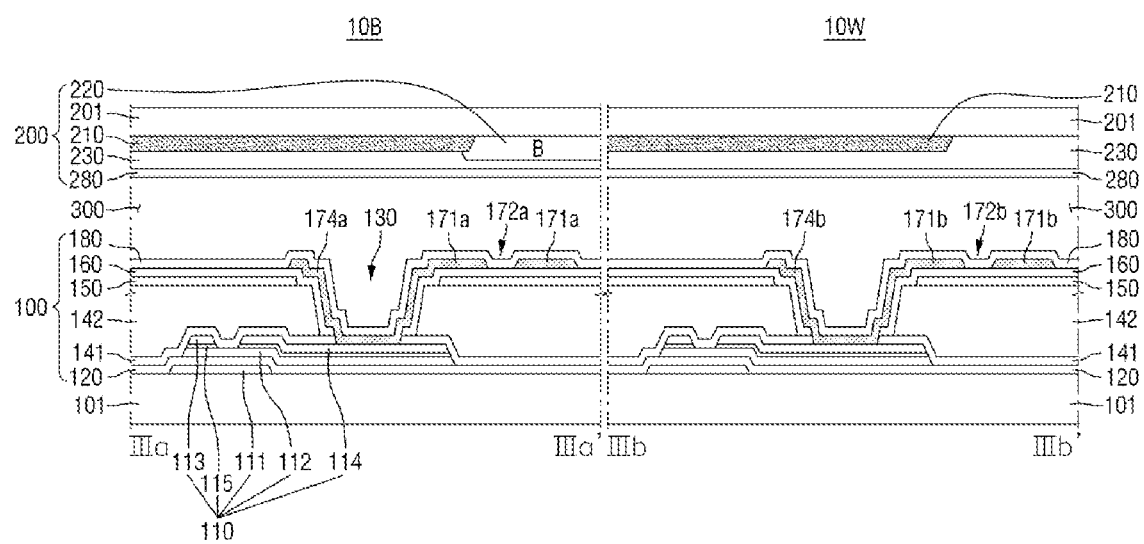
FIG. 3 comparatively illustrates the cross-sectional view taken along line IIIa-IIIa' of FIG. 2 and the cross-sectional view taken along line IIIb-IIIb' of FIG. 2.
Figure 4:
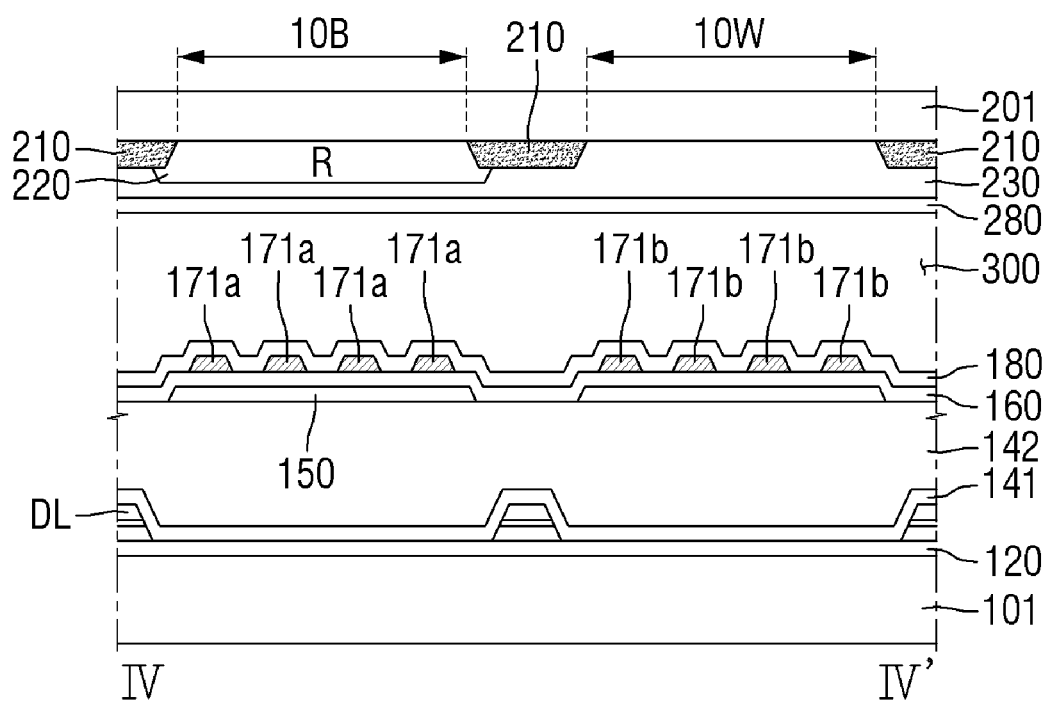
FIG. 4 is a cross-sectional view taken along line IV-IV' of FIG. 2.

FIG. 2 is a plan view of a first pixel region 10B representing a blue color and a second pixel region 10W representing a white color in the liquid crystal display device of FIG. 1. FIG. 3 comparatively illustrates the cross-sectional view taken along line IIIa-IIIa' of FIG. 2 and the cross-sectional view taken along line of FIG. 2. FIG. 4 is a cross-sectional view taken along line IV-IV' of FIG. 2.

Referring to FIG. 2 to FIG. 4, the first substrate 100 may include a first base substrate 101, a plurality of thin film transistors 110, a common electrode 150, a first pixel electrode 170a, a second pixel electrode 170b, a first alignment layer 180, a plurality of protective layers/insulation layers and the like.

The first base substrate 101 may be a transparent insulation substrate, and may be made of a material excellent in transmittance, heat resistance, chemical resistance and the like. For example, the first base substrate 101 may be a silicon substrate, a glass substrate, a plastic substrate or the like.

A gate wiring layer may be disposed on the first base substrate 101. The gate wiring layer may include the gate line GLs and a gate electrode 111.

The gate line GL may extend in the first direction X1. The gate electrode 111 may protrude upwardly from the gate line GL such that the gate electrode 111 may be formed integrally with the gate line GL without a physical boundary therebetween. A gate signal provided from the gate line GL may be applied to the gate electrode 111. The gate wiring layer may be obtained by forming a first metal layer comprising tantalum (Ta), tungsten (W), titanium (Ti), molybdenum (Mo), aluminum (Al), copper (Cu), silver (Ag), chrome (Cr), neodymium (Nd), or a combination thereof, including an alloy or a compound material including at least one of the foregoing as a primary component, and then patterning the first metal layer. The patterning process may use a mask or any other suitable means for forming a pattern.

A gate insulation layer 120 may be formed on the gate wiring layer over the whole surface of the first base substrate 101. The gate insulation layer 120 may comprise an insulation material so as to provide electrical insulation between the layer formed on the gate insulation layer 120 and the layer formed beneath the gate insulation layer 120. The gate insulation layer 120 may comprise, for example, silicon nitride (SiNx), silicon oxide (SiOx), silicon nitride oxide (SiNxOy), silicon oxynitride (SiOxNy) and the like, wherein $0<x\leq1$ and $0<y\leq1$, and may be formed into a multi-layer structure including two insulation layers having different physical properties.

A semiconductor layer 112 may be disposed on the gate insulation layer 120. At least a part of the semiconductor layer 112 may be disposed to be overlapped with the gate electrode 111. The semiconductor layer 112 may serve as a channel of the thin film transistor 110, and may turn on or off the channel depending on the voltage supplied to the gate electrode 111. The semiconductor layer 112 may be formed by patterning a semiconductor material layer including a semiconductor material such as amorphous silicon, polycrystalline silicon, oxide semiconductor and the like.

A data wiring layer is disposed on the semiconductor layer 112. The data wiring layer may include a data line DL, a source electrode 113 and a drain electrode 114.

The data line DL may extend roughly in the second direction X2 and intersect the gate line GL. A data signal may be applied to the data line DL. The data lines DL and the gate lines GL may intersect each other, thereby defining pixel regions. The pixel regions may operate independently from each other by a plurality of thin film transistors 110 connected by corresponding gate lines GL and data lines DL.

The source electrode 113 and the drain electrode 114 may be spaced apart from each other on the gate electrode 111 and the semiconductor layer 112. The source electrode 113 may be formed integrally with the data line DL without a physical boundary therebetween. Although the source electrode 113 is depicted as a part of the data line DL in FIG. 2, the source electrode 113 may protrude from the data line toward the gate electrode. The drain electrode 114 may be electrically connected to the first pixel electrode 170a through a contact hole 130 which will be described later.

The data wiring layer may be obtained by forming a second metal layer including refractory metal such as silver (Ag), gold (Au), copper (Cu), nickel (Ni), platinum (Pt), palladium (Pd), iridium (Ir), rhodium (Rh), tungsten (W), aluminum (Al), tantalum (Ta), molybdenum (Mo), cadmium (Cd), zinc (Zn), iron (Fe), titanium (Ti), silicon (Si), germanium (Ge), zirconium (Zr) and barium (Ba), an alloy thereof, a metal nitride thereof, or a combination thereof, and patterning the second metal layer.

An ohmic contact layer 115 may be interposed between the semiconductor layer 112 and the data wiring layer. The ohmic contact layer 115 may include an n+ hydrated amorphous silicon material which is highly doped with n-type impurities, or may include a silicide.

The gate electrode, the semiconductor layer 112, the source electrode 113 and the drain electrode 114 described above may constitute the thin film transistor 110 which is a tri-terminal element. Specifically, the gate electrode 111, which is a control terminal of the thin film transistor 110, may be physically connected to the gate line GL, the semiconductor layer 112 may serve as a channel of the thin film transistor 110, the source electrode 113, which is an input terminal, may be physically connected to the data line DL, and the drain electrode 114, which is an output terminal, may be electrically connected to the first pixel electrode 170a.

A protective layer 141 may be formed on the data wiring layer over the whole surface of the first base substrate 101. The protective layer 141 may comprise an organic layer and/or an inorganic layer, and may have a single layer structure of a multi-layer structure. The protective layer 141 may prevent the wirings formed therebelow and the semiconductor layer 112 of the thin film transistor 110 from being exposed and directly contacting an organic material.

A first insulation layer 142 may be disposed on the whole surface of the protective layer 141. The first insulation layer 142 may include an organic material. The first insulation layer 142 may enable a plurality of components stacked on the first base substrate 101 to have a uniform height.

The common electrode 150 may be disposed on the first insulation layer 142. The common electrode 150 may be a transparent electrode formed by patterning a third metal layer. The third metal layer may comprise indium tin oxide (ITO), indium zinc oxide (IZO) or the like, but the present disclosure is not limited thereto and any suitable material may be used. The common electrode 150 may cooperate with first and second pixel electrodes 170a and 170b, which will be further described below, so as to form a fringe field to control liquid crystal molecules in the liquid crystal layer 300. The common electrode 150 may be overlapped with almost the whole region in each of the pixel regions 10B and 10W excluding a part of each of the pixel regions 10B and 10W. A second insulation layer 160 may be disposed on the common electrode 150 so as to provide insulation between the common electrode 150 beneath the second insulation layer 160 and the first and second pixel electrodes 170a and 170b on the second insulation layer 160.

The contact hole 130 may be disposed in, e.g., formed in, the protective layer 141, the first insulation layer 142, and the second insulation layer 160 so as to expose a part of the drain electrode 114. The drain electrode 114 may be electrically connected to the first pixel electrode 170a through the contact hole 130.

The first pixel electrode 170a may be disposed on the second insulation layer 160 and the drain electrode 114 exposed by the contact hole 130 in the first pixel region 10B. Similarly, the second pixel electrode 170b may be disposed on the second insulation layer 160 and the drain electrode 114 in the second pixel region 10W. As mentioned above, the first and second pixel electrodes 170a and 170b may cooperate with the common electrode 150 therebeneath so as to form a fringe field to control liquid crystal molecules. The first and second pixel electrodes 170a and 170b may be transparent electrodes formed by patterning a fourth metal layer. The fourth metal layer may be made of a material which is the same as or different from the material of the third metal layer.

The first pixel electrode 170a may include a plurality of first branched finger electrodes 171a, a plurality of first apertures 172a formed between adjacent first branched finger electrodes 171a, a first connection electrode 173a for interconnecting at least either one ends or the other ends of the plurality of first branched finger electrodes 171a, and a first protruded electrode 174a protruding from the first connection electrode 173a toward the contact hole 130.

Each of the first apertures 172a has a shape corresponding to the two adjacent first branched finger electrodes 171a, and each of the first branched finger electrodes 171a and each of the first apertures 172a may have a bar shape symmetrically bent about a roughly central portion of the first pixel region 10B. Thus-configured first pixel electrode 170a may enable the main directions of fringe field in an upper portion and a lower portion about the central portion of each first pixel region 10B to be different from each other, thus forming two domains in one pixel region. The liquid crystal molecules in different domains in one pixel region may move differently, which finally enables the major axes of the liquid crystal molecules to be aligned differently from each other, thus reducing a color shift phenomenon at a specific azimuth angle. The first protruded electrode 174a may be electrically connected to the drain electrode 114 through the contact hole 130 so as to receive a data voltage provided thereto, and the first connection electrode 173a may function to interconnect the first protruded electrode 174a and the plurality of first branched finger electrodes 171a.

Similarly, the second pixel electrode 170b may include a plurality of second branched finger electrodes 171b, a plurality of second apertures 172b, a second connection electrode 173b and a second protruded electrode 174b, and the shape and arrangement thereof may be the same as those of the first pixel electrode 170a, and thus detailed descriptions thereof will be omitted.

The first alignment layer 180 may be disposed over the whole surface of the first and second pixel electrodes 170a and 170b. The first alignment layer 180 having anisotropy may align the liquid crystal molecules in the liquid crystal layer 300 adjacent to the first alignment layer 180 such that the liquid crystal molecules are directed in a specific direction on a plane. The first alignment layer 180 may be a photoalignment layer including a photo functional group-containing material capable of a photoreaction such as photopolymerization, photolysis, photoisomerization or the like, but the present disclosure is not limited thereto.

The second substrate 200 will now be further described. The second substrate 200 may include a second base substrate 201, a light blocking member 210, a color filter 220, an overcoat layer 230, a second alignment layer 280 and the like.

The second base substrate 201 may be a transparent insulation substrate like the first base substrate 101. The light blocking member 210 may be disposed on the second base substrate 201. The light blocking member 210 may be, for example, a black matrix. The light blocking member 210 may be disposed at a boundary between the plurality of pixel regions, that is, in a region overlapped with the data lines and a region overlapped with the thin film transistor 110. That is, the plurality of pixel regions 10B and 10W may be divided by the light blocking member 210. The light blocking member 210 may be disposed at the boundary between the pixel regions 10B and 10W where light transmittance occurs so as to prevent light leakage defects.

The color filter 220 may be disposed on a portion of the light blocking member 210 overlapped with the pixel region. The color filter 220 may selectively transmit light in a specific wavelength range. The color filter 220 may be interposed between the two neighboring data lines. The color filters having different colors for transmitting light in different wavelength ranges may be disposed in the respective pixel regions 10B and 10W adjacent to each other, or no color filter may be disposed in the pixel regions 10W.

For example, the blue color filter 220 may be disposed in the first pixel region 10B. The white light incident from a backlight unit (not shown) beneath a liquid crystal display panel may penetrate through the blue color filter 220 such that only blue light can be selectively emitted. Thus, the first pixel region 10B may be viewed as a pixel region for representing a blue color.

In the meantime, no color filter may be disposed in the second pixel region 10W. Thus, the white light incident from the backlight unit (not shown) may penetrate through the liquid crystal display panel as it is, and the second pixel region 10W may be viewed as a pixel region representing a white color. Specifically, since no color filter is disposed in the second pixel region 10W, the overcoat layer 230 may be disposed directly on the second base substrate 201.

The overcoat layer 230 may be disposed on the light blocking member 210 and the color filter 220 over the whole surface of the second base substrate 201. The overcoat layer 230 may be an organic layer made of an organic material. The overcoat layer 230 may prevent the light blocking member 210 and the color filter 220 from being separated from the second base substrate 201, and enable components stacked on the second base substrate 201 to have a uniform height. Furthermore, the overcoat layer 230 may inhibit the liquid crystal layer 300 from being contaminated by a compound such as a solvent introduced from the color filter 220, thereby preventing a defect such as an afterimage which might otherwise occur during an operation of a screen.

The overcoat layer 230 may be formed by spreading an overcoat composition. The overcoat composition may include 5 weight percent (wt %) to 10 wt % of binder resin, 1 wt % to 10 wt % of a monomer, 0.001 wt % to 10 wt % of a material capable of absorbing ultraviolet light of a wavelength range from 200 nm to 400 nm, 0.1 wt % to 12 wt % of an additive, and a remainder being a solvent, each based a total weight of the overcoat composition.

Specifically, the binder resin may be heat-curable binder resin, but the present disclosure is not limited thereto, and the binder resin may also be photocurable binder resin. The binder resin may form an overcoat layer through heat- and/or photo-curing process, and may stabilize dispersion. The monomer may be a poly functional monomer having a poly functional group. The poly functional monomer may form crosslink between binder resin and a monomer through polymerization so as to harden the overcoat layer.

In addition, the overcoat composition may include an additive for stabilizing dispersion of a composition in a solvent, improving ease of coating and increasing bonding properties. The additive may include an anhydride hardener, an initiator, an inhibitor, a bonding enhancer, a surface active agent and the like, but the present disclosure is not limited thereto.

The material capable of absorbing ultraviolet light of a wavelength range from 200 nm to 400 nm may be a conjugated compound. The conjugated compound may include an unsaturated bond, and may mean a compound containing molecules in which a single bond and a double bond are alternately arranged. The conjugated compound may include as a repeating unit, for example, one or more of 1,3-butadiene, 2-methyl-1,3-butadiene, 1,3-cyclohexadiene, 1,3,5-hexatriene, 1,3,5,7-octatetraene, 3-buten-2-one, benzene and the following structures, in which a, b, c, d, and e may each independently be 1 to 10,000, or 100 to 1000, but the present disclosure is not limited thereto.

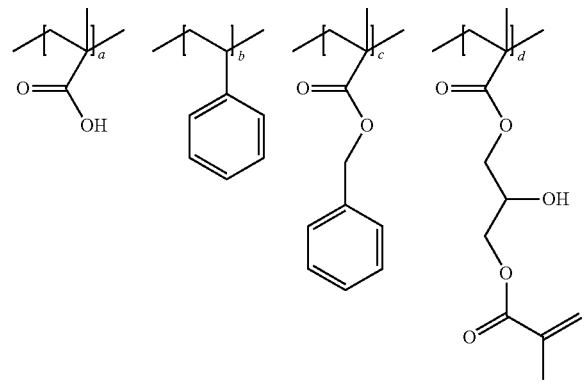

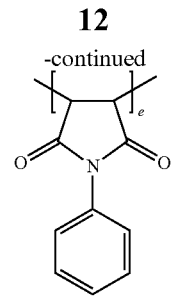

In some embodiments, the material capable of absorbing ultraviolet light having a wavelength range from 200 nm to 400 nm may comprise an allene-based compound, an alkyne-based compound, a thioether group-containing compound, an aldehyde group- or ketone group-containing carbonyl-based compound, an ester group-containing compound, an imine group-containing compound, an azo-based compound, a nitroso group-containing compound, or an aldoketene- or ketoketene-containing ketene-based compound, or a combination thereof.

Since the overcoat layer 230 includes the material capable of absorbing ultraviolet light of a wavelength range from 200 nm to 400 nm, the overcoat layer 230 may directly absorb the UV laser beam irradiated in the repairing process, which will be further described later. The overcoat layer 230 directly absorbs the UV laser beam so as to generate thermal energy and form a microcavity therein to achieve blackening. This will be further described in detail later with reference to FIG. 5 to FIG. 7.

The second alignment layer 280 may be disposed over the whole upper surface of the overcoat layer 230. The second alignment layer 280 may be made of a material which is the same as that of the first alignment layer 180, and thus further detailed description thereof will be omitted.

A method of repairing a liquid crystal display device will hereinafter be described in further detail.

Figure 5:
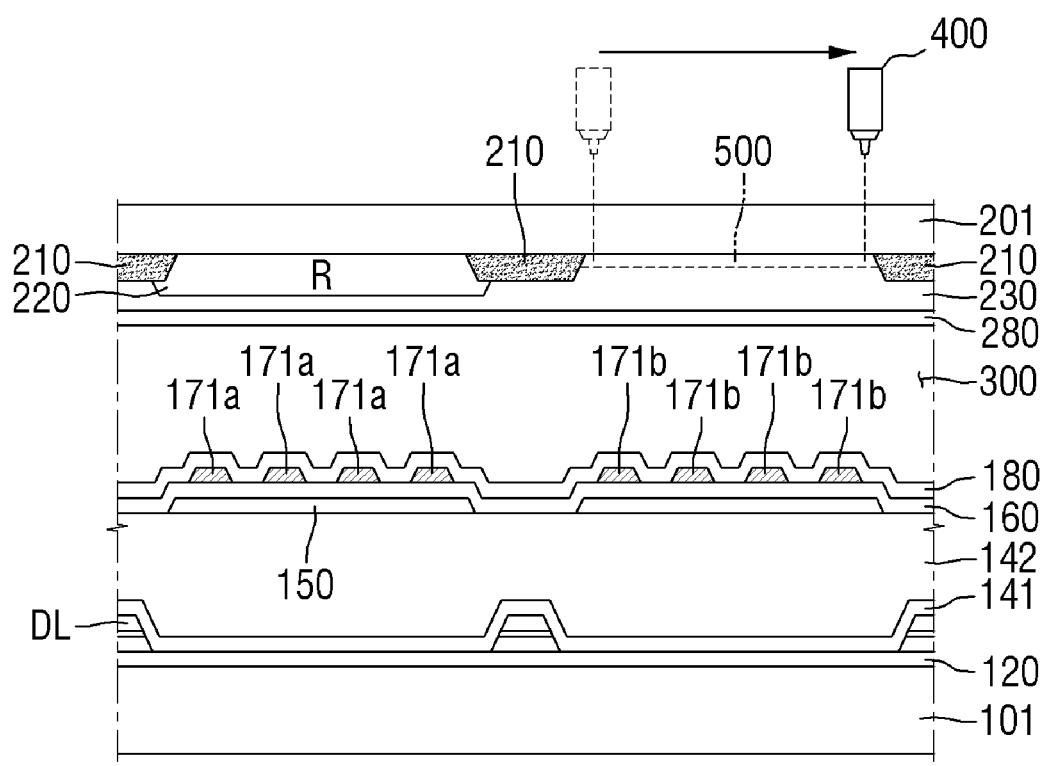
FIG. 5 to FIG. 7 are cross-sectional views illustrating an embodiment of a method of repairing a liquid crystal display device.
Figure 6:
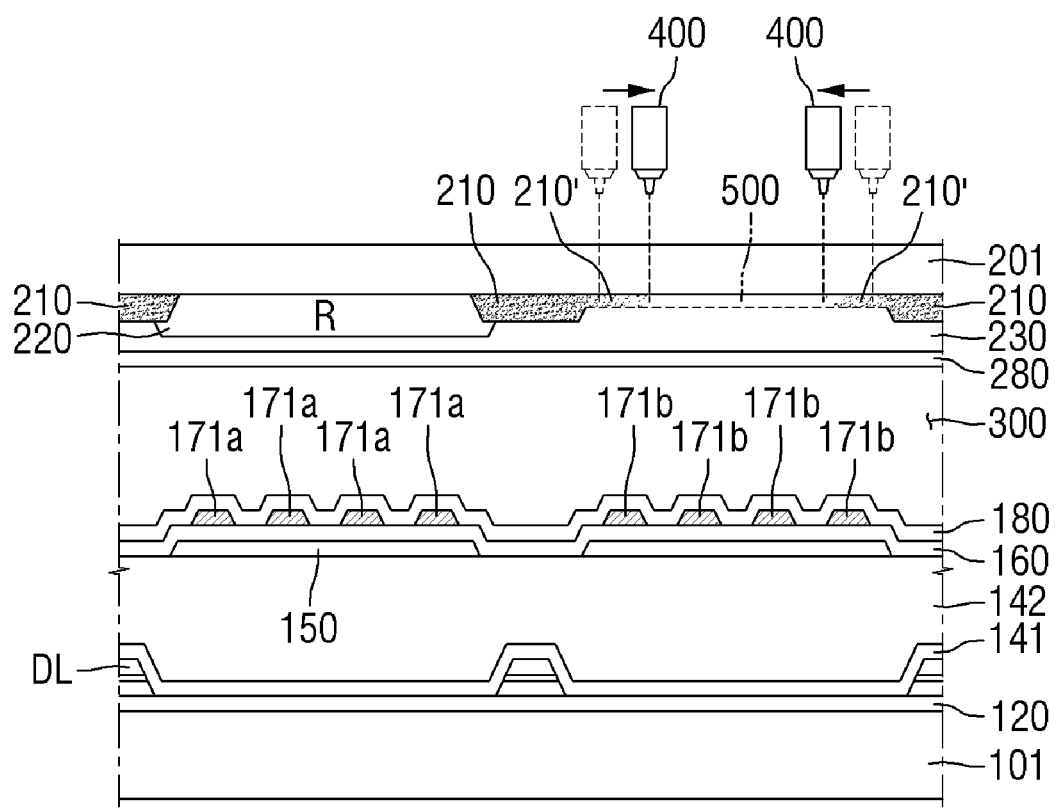
Figure 7:
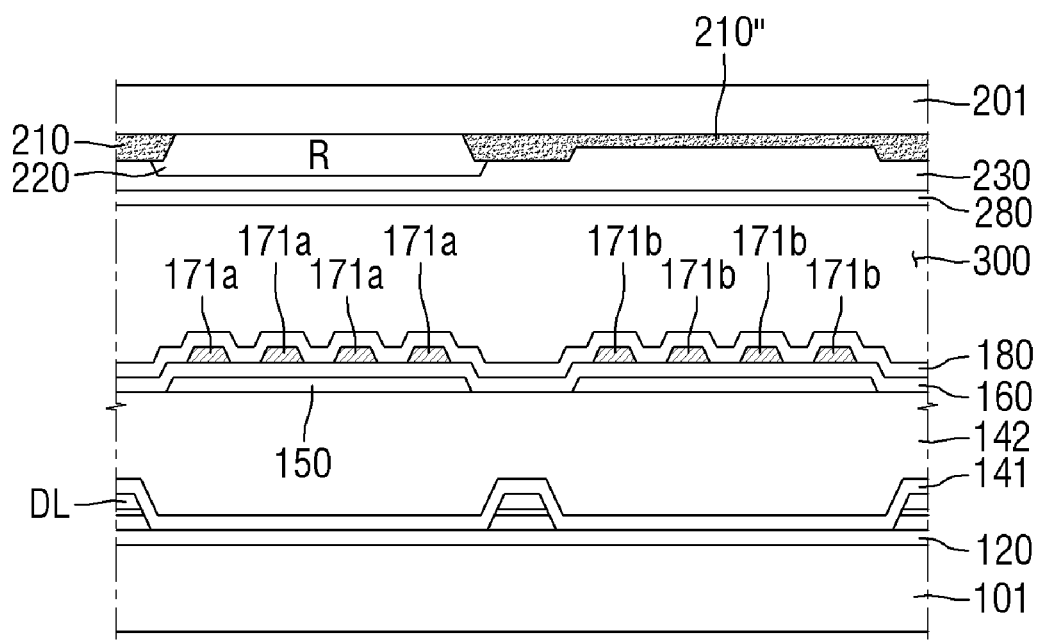

FIG. 5 to FIG. 7 are cross-sectional views illustrating an embodiment of a method of repairing a liquid crystal display device.

Although not shown in the drawings, the liquid crystal display device described with reference to FIG. 4 is manufactured prior to the method or repairing the liquid crystal display device described with reference to FIG. 5. Then, a test process is performed to determine whether there exist defective pixels, that is, pixels having hot pixel defects or dead pixel defects. The test process may be carried out, for example, by a method of forming a test pattern in a liquid crystal display device and determining whether there exists a hot pixel or a dead pixel and detecting the location of the hot or dead pixel. In the present embodiment, it is assumed for the purposes of explanation that hot pixel defects have occurred in the second pixel region 10W representing a white color.

Referring to FIG. 5, a laser beam 400 is irradiated to the second pixel region (the right aperture region in the drawing) so as to form a microcavity 500 in the overcoat layer 230 adjacent to the second base substrate 201 in the second pixel region. The microcavity 500 may have a planar area overlapped with the second pixel region. The material constituting the overcoat layer 230 may be ablated by the laser beam 400, thus forming the microcavity 500 between the second base substrate 201 and the overcoat layer 230. The microcavity 500 may have a thickness equal to or thinner than the thickness of the light blocking member 210, but the present disclosure is not limited thereto.

As described above, since the overcoat layer 230 contains the material capable of absorbing ultraviolet light of a wavelength range from 200 nm to 400 nm, the ultraviolet light emitted from the laser beam 400 may be directly absorbed in an upper interfacial surface of the overcoat layer 230 contacting the second base substrate 201 rather than penetrating through the overcoat layer 230. When the overcoat layer 230 absorbs the ultraviolet light, thermal energy is generated and binding among organic molecules constituting the overcoat layer 230 is disconnected to discharge plasma including neutral atoms, molecules, cation and anion, radicals, clusters, electrons and quantum, causing an ablation.

The laser beam 400 used in this case may emit ultraviolet light having a wavelength range from 200 nm to 400 nm so that the overcoat layer 230 may absorb the ultraviolet light. When the wavelength of the laser beam is 200 nm or more, the laser beam may penetrate through the second base substrate 201 without causing a substantial damage to the second base substrate 201, and when the wavelength of the laser beam is 400 nm or less, the second alignment layer 280, the liquid crystal layer 300, or electrodes or organic/inorganic layers in the first substrate beneath the overcoat layer 230 may be prevented from being damaged by the laser beam which has penetrated through the overcoat layer 230.

Furthermore, the laser beam 400 used in this case may have a pulse width of 450 picoseconds (ps) to 500 ps. When the laser beam 400 has a pulse width of 450 ps or more, the overcoat layer 230 may be prevented from being carbonized, and when the laser beam 400 has a pulse width of 550 ps or less, the microcavity may be effectively formed.

The laser beam 400 may be irradiated on the second pixel region in a scanning manner. That is, the laser beam 400 may be irradiated to the whole area of the pixel region while moving the laser beam 400 having a predetermined active beam size. However, the present disclosure is not limited thereto, and the laser beam 400 may be radiated in a block shot in which the laser beam having a beam size corresponding to the whole area of the second pixel region is irradiated at a shot.

Since the overcoat layer 230 directly absorbs the laser beam 400, the overcoat layer 230 may directly absorb the energy of the laser beam 400 through the upper interfacial surface thereof contacting the second base substrate 201, and since the microcavity 500 is formed between the second base substrate 201 and the overcoat layer 230, the liquid crystal layer 300 may be prevented from being contaminated by foreign substances or the like generated when the overcoat layer 230 is ablated. Furthermore, the microcavity 500 can be formed in the second substrate 200 in which the pixel electrode 170b or the common electrode 150 is not disposed, thereby minimizing an influence of foreign substances caused by an electric charge of an electrode and preventing defects such as afterimage which might otherwise occur during an operation of a liquid crystal display device.

Furthermore, since the microcavity 500 is formed in the overcoat layer 230 by using the laser beam 400 having ultraviolet light of a wavelength range from 200 nm to 400 nm, the subsequent process may use the same laser beam, thus unifying blackening facilities and improving processability.

Referring now to FIG. 6, the laser beam 400 is irradiated on at least one light blocking member 210 adjacent to the second pixel region (e.g., the right aperture region in the drawing) so as to process the light blocking member 210. When the light blocking member 210 is irradiated with the laser beam 400, binding among the molecules of the light blocking member 210 may be disconnected to generate light blocking member particles 210'. The light blocking member particles 210' may be generated when the light blocking member 210 absorbs thermal energy from the laser beam 400. The light blocking member particles 210' may have a predetermined flowability. The density of the light blocking member 210 after generating the light blocking member particles 210' by an ablation may be smaller than the density of the light blocking member 210 before ablation. In an embodiment, the thickness of the light blocking member 210 after generating the light blocking member particles 210' by an ablation may be thinner than the thickness of the light blocking member 210 before ablation.

The wavelength and pulse width of the laser beam 400 used in this case may be the same as those of the laser beam 400 used in forming the microcavity 500. The microcavity 500 can be formed and the light blocking member 210 can be processed using the same laser equipment as mentioned above, avoiding the necessity of changing facilities and processes may be unified to achieve improved processability.

The laser beam 400 may be irradiated on the light blocking member 210 in a scanning manner. The light blocking member 210 may be processed by moving the laser beam 400 along an edge of the light blocking member 210 adjacent to the second pixel region which is a defective pixel region, but the present disclosure is not limited thereto.

Subsequently, the laser beam 400 may be irradiated from the light blocking member 210 toward the second pixel region 10W in a scanning manner so as to diffuse light blocking member particles 210'. The light blocking member particles 210' having flowability may absorb energy of the laser beam 400 so as to be sequentially diffused, and the diffusion direction of the light blocking member particles 210' may be determined in the direction of movement of the laser beam 400.

FIG. 6 illustrates an example where the laser beam 400 is irradiated in an direction towards the center of the microcavity 500 from each of a left light blocking member and a right light blocking member of the second pixel region, but unlike those shown in FIG. 6, the laser beam 400 may be irradiated through a single path from one light blocking member to the other light blocking member if desired.

When the laser beam 400 is irradiated toward the center of the microcavity 500 from each of the left light blocking member and the right light blocking member in the second pixel region, the light blocking member particles 210' may also be leaked from the light blocking member 210 and diffused toward the center of the second pixel region in a plane.

Referring now to FIG. 7, a blackening member 210" may be formed by expanding the area of the light blocking member 210 in the second pixel region (the right region in the drawing). The blackening member 210" may include a light blocking member (not shown) overlapped with the data line, and a light blocking member (not shown) formed by hardening or semi-hardening light blocking member particles and overlapped with an aperture region. That is, the blackening member 210" may be formed by expanding the area of the light blocking member by the light blocking member particles 210' generated through processing the light blocking member 210, and a physical boundary between the light blocking member 210 and the light blocking member formed by hardening or semi-hardening the light blocking member particles 210' may not be visible. FIG. 7 illustrates an example where the blackening member 210" is completely overlapped with the second pixel region, but the blackening member 210" may be overlapped with only a part of the second pixel region unlike those shown in FIG. 7. Furthermore, the thickness of the blackening member 210" may be substantially the same as the thickness of the microcavity 500, and may be thinner than the thickness of the adjacent light blocking member 210, but the present disclosure is not limited thereto, and the thickness of the blackening member 210" may be substantially the same as the thickness of the adjacent light blocking member 210.

The blackening member 210" may be overlapped with the second pixel region, which is a defective pixel region, so as to substantially block light penetrating through the second pixel region. Thus, the second pixel region, which represented a white color, may always represent a black color regardless of whether a voltage is applied to the pixel electrode 170b and the common electrode 150, thereby blackening the second pixel region.

A liquid crystal display device and a liquid crystal display device repairing method according to another embodiment will hereinafter be described. For clarity, description of the components substantially the same as or similar to those of the liquid crystal display device and which have been disclosed will be omitted. Also, details can be determined by those skilled in the art without undue experimentation.

Figure 8:
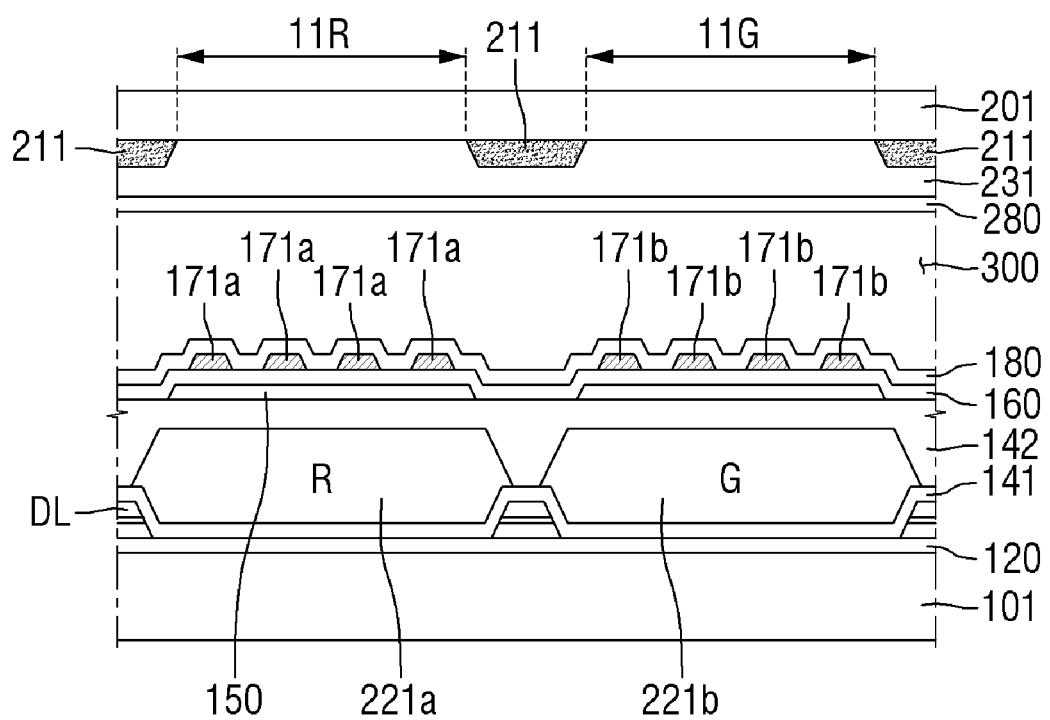
FIG. 8 is a cross-sectional view of an embodiment of a liquid crystal display device.
Figure 9:
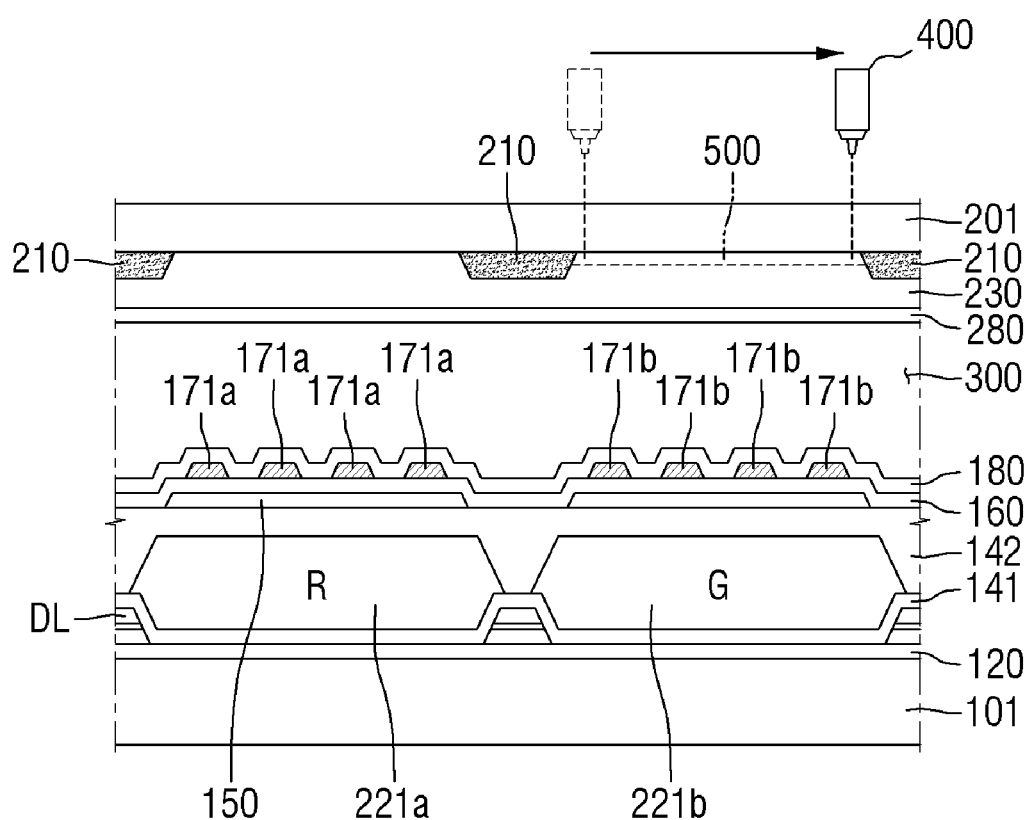
FIG. 9 to FIG. 11 are cross-sectional views illustrating another embodiment of a method of repairing a liquid crystal display device.
Figure 10:
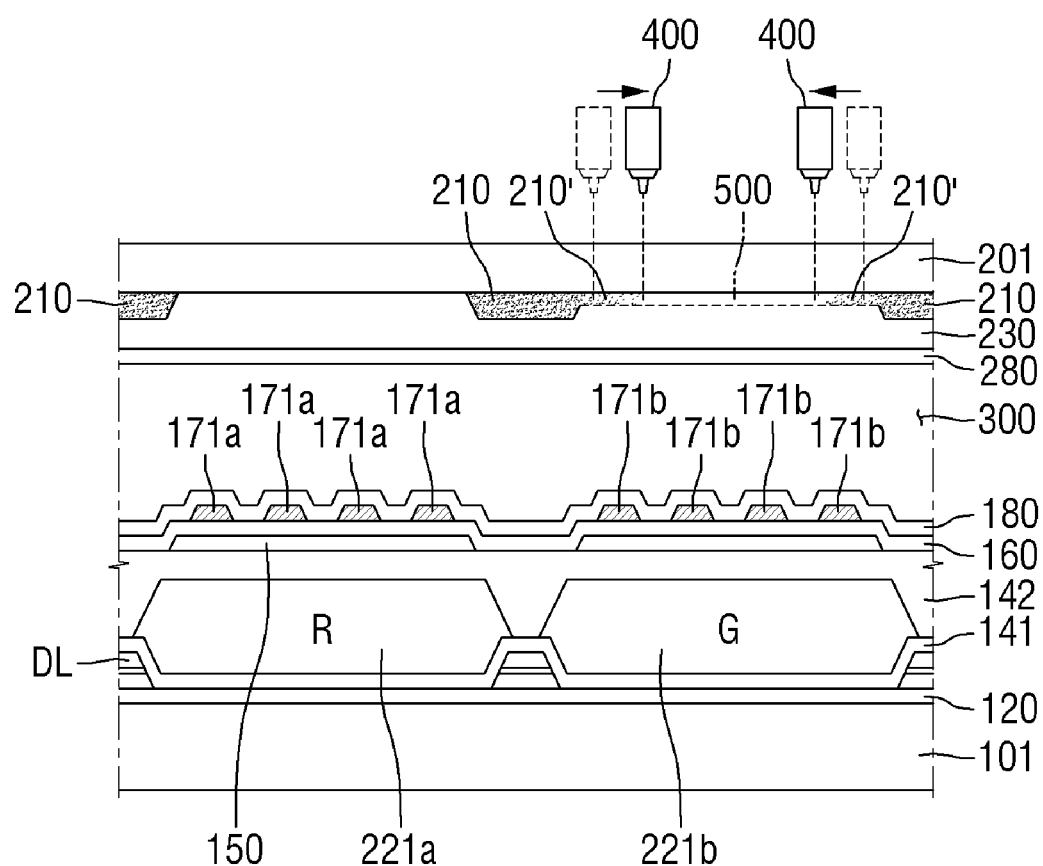
Figure 11:
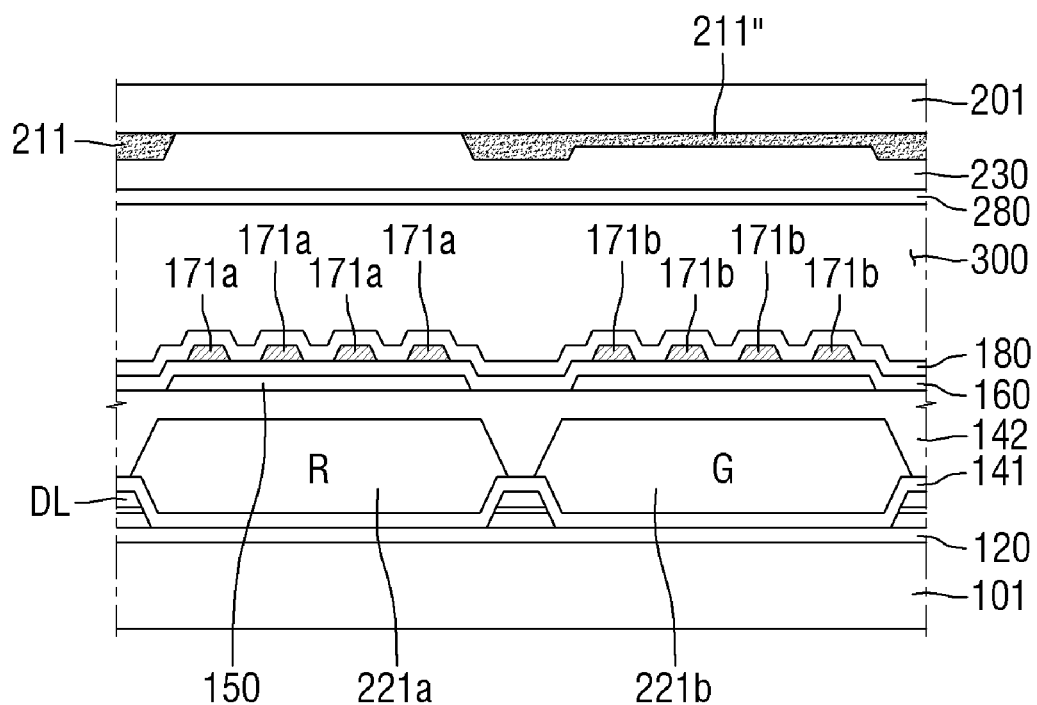

FIG. 8 is a cross-sectional view of another embodiment of the liquid crystal display device. FIG. 9 to FIG. 11 are cross-sectional views illustrating another embodiment of a method of repairing a liquid crystal display device.

Referring to FIG. 8, a first substrate of the liquid crystal display device may include the first base substrate 101, a plurality of thin film transistors (not shown), a plurality of color filters 221a and 221b, the common electrode 150, a first pixel electrode, a second pixel electrode, the first alignment layer 180, a plurality of protective layers/insulation layers and the like.

The liquid crystal display device differs from the liquid crystal display device according to the embodiment described with reference to FIG. 4 in that the plurality of color filters 221a and 221b are disposed on the thin film transistor of the first substrate rather than the second substrate so as to form a color filter on array structure.

Specifically, the color filters 221a and 221b may be interposed between the protective layer 141 and the first insulation layer 142 on the first substrate. The color filters 221a and 221b may be disposed on the protective layer 141 between two neighboring data lines so as to be overlapped with the respective pixel regions 11R and 11G.

For example, the red color filter 221a may be disposed in the first pixel region 11R. The white light incident from a backlight unit (not shown) beneath a liquid crystal display panel may penetrate through a blue color filter such that only red light can be selectively emitted. Thus, the first pixel region 11R may be viewed as a pixel region representing a red color. Furthermore, the green color filter 221b may be disposed in the second pixel region 11G. The white light incident from a backlight unit may penetrate through a red color filter such that only green light can be selectively emitted. Thus, the second pixel region 11G may be viewed as a pixel region representing a green color.

The first insulation layer 142 may be disposed over the whole surface of the protective layer 141 and the plurality of color filters 221a and 221b. The first insulation layer 142 may enable the plurality of components stacked on the first base substrate 101 to have a uniform height.

A second substrate will now be described. The second substrate may include the second base substrate 201, a light blocking member 211, an overcoat layer 231, the second alignment layer 280 and the like.

The light blocking member 211 may be disposed in a boundary region between the plurality of pixel regions, that is, in a region overlapped with the data lines and a region overlapped with the thin film transistor. That is, the plurality of pixel regions 11R and 11G may be divided by the light blocking member 211.

The overcoat layer 231 may be disposed on the light blocking member 211 over the whole surface of the second base substrate 201. The overcoat layer 231 may include a material capable of absorbing ultraviolet light of a wavelength range from 200 nm to 400 nm. The overcoat layer 231 according to the present embodiment may comprise a material substantially the same as the material of the overcoat layer 230 of the embodiment described with reference to FIG. 4, and thus repetitive detailed description thereof will be omitted.

Another embodiment of the method of repairing a liquid crystal display device will hereinafter be disclosed for an example where hot pixel defects have occurred in the second pixel region 11G representing a green color.

Referring to FIG. 9, the laser beam 400 is irradiated to the second pixel region (the right aperture region in the drawing), so as to form a microcavity 501 in the overcoat layer 231 adjacent to the second base substrate 201 in the second pixel region 11G. The material constituting the overcoat layer 231 may be ablated by the laser beam 400, thus forming the microcavity 501 between the second base substrate 201 and the overcoat layer 231. As described above, the laser beam 400 may have ultraviolet light of a wavelength range from 200 nm to 400 nm so that the overcoat layer 231 may absorb the ultraviolet light.

In the present embodiment, the plurality of color filters 221a and 221b may be disposed on the first substrate rather than the second substrate, thus enabling the overcoat layer 231 to be located higher than the color filters 221a and 221b in the pixel regions 11R and 11G. Thus, since the overcoat layer 231 may first absorb the laser beam 400 when the laser beam 400 is irradiated to the second pixel region 11G, the laser beam 400 may not reach the green color filter 221b on the first substrate. Thus, the green cavity 501 may be formed in the overcoat layer 231 overlapped with the pixel regions in which the color filters 221a and 221b are disposed.

Referring to FIG. 10, the laser beam 400 may be irradiated on at least one light blocking member 211 adjacent to the second pixel region (the right aperture region in the drawing) so as to process the light blocking member 211. The light blocking member 211 irradiated with the laser beam 400 may generate light blocking member particles 211'.

Subsequently, the laser beam 400 may be irradiated from the light blocking member 211 toward the second pixel region 10G in a scanning manner so as to diffuse light blocking member particles 211'. When the laser beam 400 is irradiated toward the center of the microcavity 501 from each of the left light blocking member and the right light blocking member in the second pixel region, the light blocking member particles 211' may also be leaked from the light blocking member 211 and diffused toward the center of the second pixel region in a plane.

Referring now to FIG. 11, a blackening member 211" may be formed by expanding the area of the light blocking member 211 in the second pixel region (the right region in the drawing). The blackening member 211" may include a light blocking member (not shown) overlapped with the data line, and a light blocking member (not shown) formed by hardening or semi-hardening light blocking member particles 211' and overlapped with an aperture region. The blackening member 211" may be overlapped with the second pixel region so as to substantially block light penetrating through the second pixel region. Thus, the second pixel region 11G, which represented a green color, may always represent a black color regardless of whether a voltage is applied to the pixel electrode 170b and the common electrode 150, thereby blackening the second pixel region.

In the present embodiment, the blackening member 211", which blackens the pixel region in which the color filter is disposed, may be formed without causing any physical/chemical damage to the color filter. Thus, foreign substances generated when the color filter absorbs the laser beam may be prevented from being attached between the plurality of insulation layers or from having an influence on an electric field, and the blackening member can be removed as desired so as to restore the pixel region.

When a microcavity is formed in a color filter, laser beams having different wavelength ranges can be irradiated depending on the color of the pigment contained in the color filter, but the liquid crystal display device of the present embodiment is configured in that the microcavity is formed in the overcoat layer 231 rather than the color filter and filled with the blackening member 211", thereby enabling the pixel regions representing different colors to be blackened using the laser beam having the same wavelength range. Consequently, laser facilities used in a repairing process can be unified.

A liquid crystal display device and a method of repairing a liquid crystal display device according to yet another embodiment will hereinafter be further disclosed.

Figure 12:
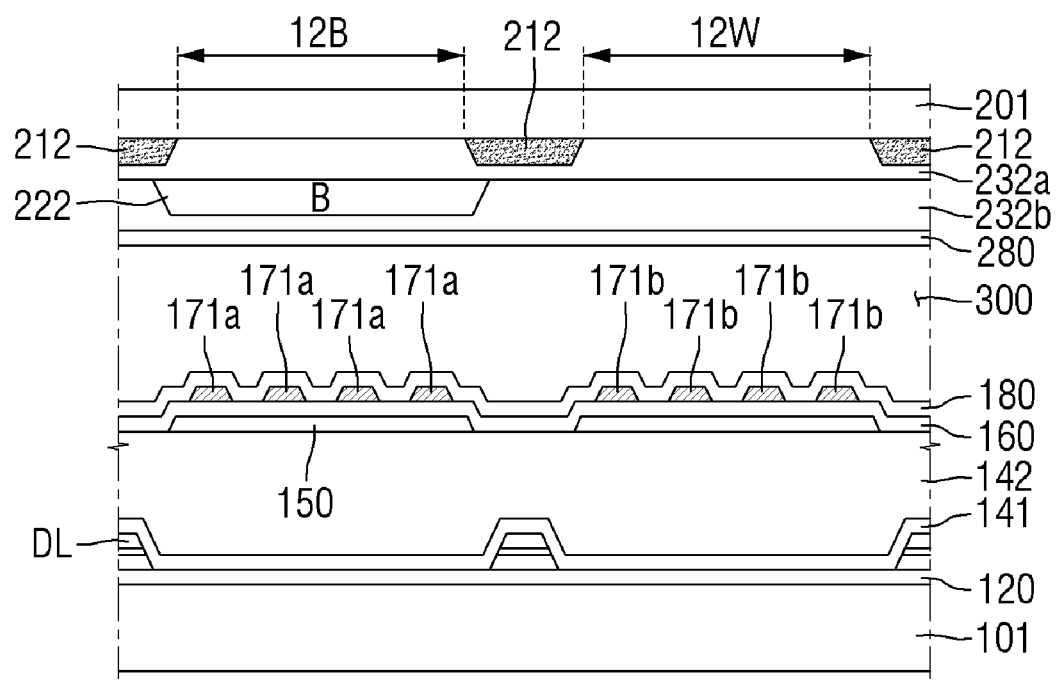
FIG. 12 is a cross-sectional view of yet another embodiment of a liquid crystal display device.
Figure 13:
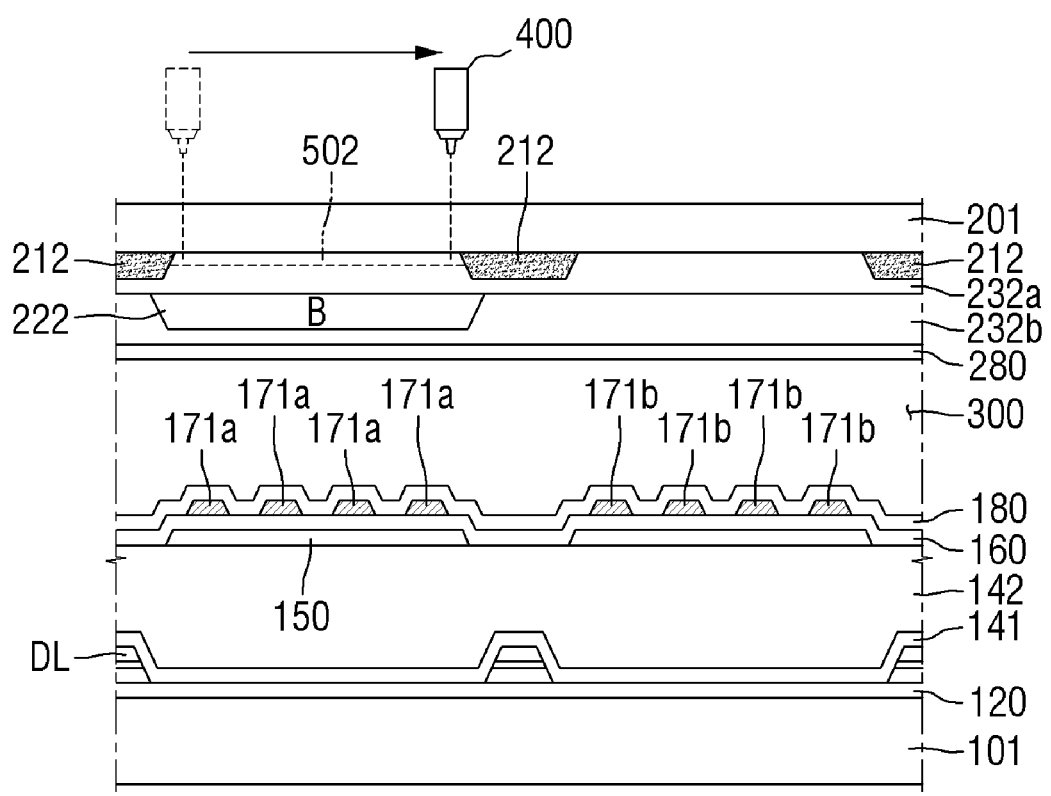
FIG. 13 to FIG. 15 are cross-sectional views illustrating yet another embodiment of a method of repairing a liquid crystal display device.
Figure 14:
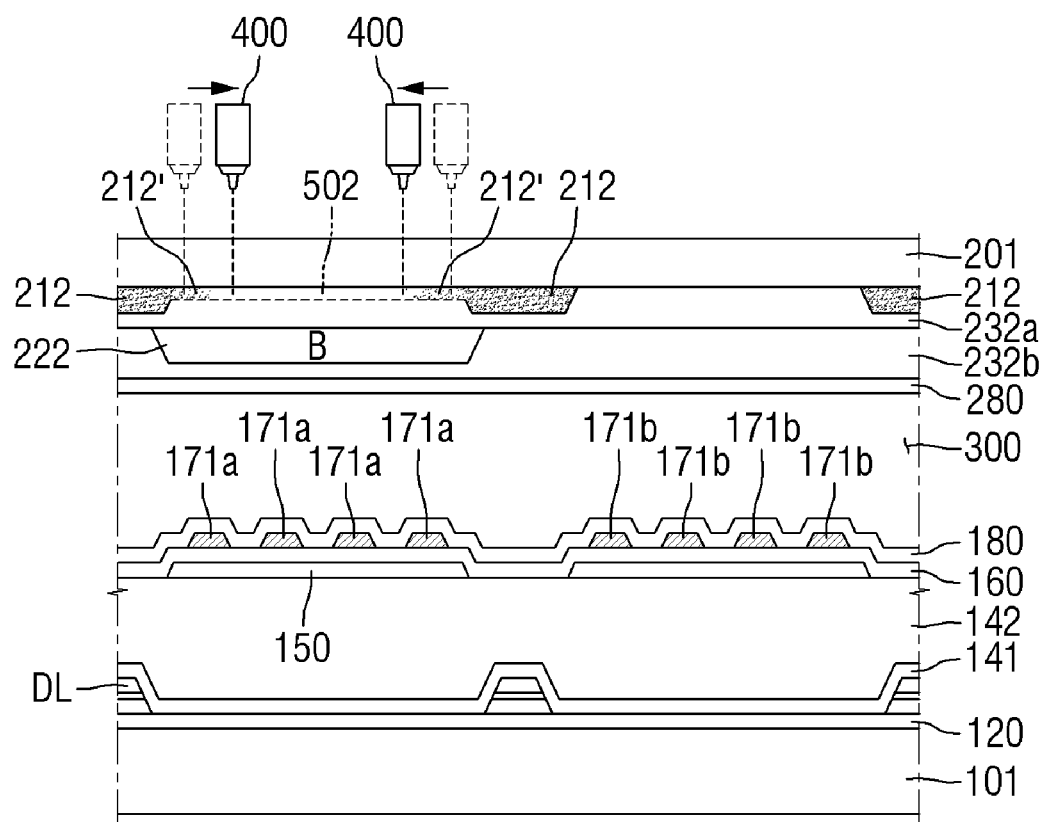
Figure 15:
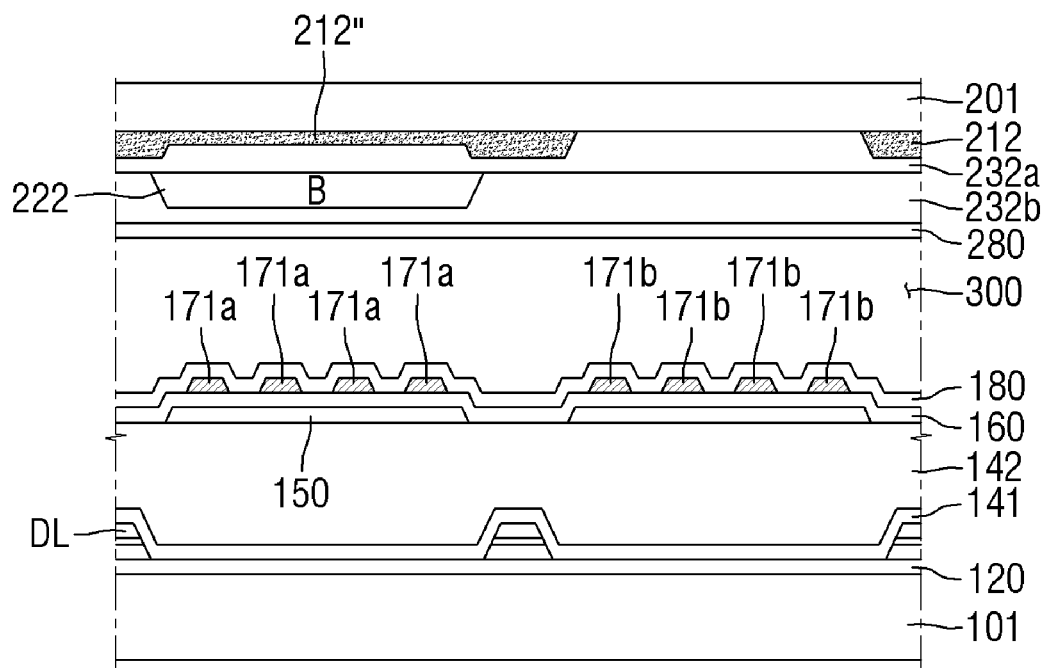

FIG. 12 is a cross-sectional view of another embodiment of a liquid crystal display device. FIG. 13 to FIG. 15 are cross-sectional views illustrating a method of repairing a liquid crystal display device.

Referring to FIG. 12, a second substrate of the liquid crystal display device according to yet another embodiment may include the second base substrate 201, a light blocking member 212, an organic layer 232a, a color filter 222, an overcoat layer 232b and the second alignment layer 280.

The liquid crystal display device according to the present embodiment differs from the liquid crystal display device according to the embodiment described with reference to FIG. 4 in that the color filter 222 is disposed on the organic layer 232a rather than the second base substrate 201.

The organic layer 232a may be disposed on the light blocking member 212 over the whole surface of the second base substrate 201. The organic layer 232a may prevent the light blocking member 212 from being separated, and may have a microcavity formed therein through the laser irradiation process, which will be further described later. The organic layer 232a may include a material capable of absorbing ultraviolet light of a wavelength range from 200 nm to 400 nm. The organic layer 232a according to the present embodiment may include a material substantially the same as the material of the overcoat layer 230 of the embodiment described above with reference to FIG. 4, and thus repetitive description is omitted.

The color filter 222 may be disposed on a portion of the organic layer 232a overlapped with the pixel region. Specifically, the blue color filter 222 may be disposed in a first pixel region 12B so that the fixe pixel region 12B may be viewed as a pixel region representing a blue color. Also, no color filter is disposed in a second pixel region 12W so that the second pixel region 12W may be viewed as a pixel region representing a white color.

The overcoat layer 232b may be disposed on the organic layer 232a and the color filter 222 over the whole surface of the second base substrate 201, and the second alignment layer 280 may be disposed on the overcoat layer 232b.

A method or repairing a liquid crystal display device according to yet another embodiment will hereinafter be further disclosed. In the present embodiment, an example where hot pixel defects have occurred in the first pixel region 11B representing a blue color will be described.

Referring to FIG. 13, the laser beam 400 is irradiated to the first pixel region (the left aperture region in the drawing) so as to form a microcavity 502 in the organic layer 232a adjacent to the second base substrate 201 in the first pixel region. The material constituting the organic layer 232a may be ablated by the laser beam 400, thus forming the microcavity 502 between the second base substrate 201 and the organic layer 232a. As described above, the laser beam 400 used in this case may have ultraviolet light of a wavelength range from 200 nm to 400 nm so that the organic layer 232a may absorb the ultraviolet light.

In the present embodiment, the organic layer 232a may be interposed between the color filter 222 and the second base substrate 201, thus enabling the organic layer 232a to be located higher than the color filter 222 in the first pixel region. Thus, since the organic layer 232a may first absorb the laser beam 400 when the laser beam 400 is irradiated to the first pixel region, the laser beam 400 may not reach the color filter 222. Thus, the green cavity 502 may be formed in the organic layer 232a overlapped with the first pixel region.

Referring to FIG. 14, the laser beam 400 may be irradiated to at least one light blocking member 212 adjacent to the first pixel region (the left aperture region in the drawing) so as to process the light blocking member 212. The light blocking member 212 irradiated with the laser beam 400 may generate light blocking member particles 212'.

Subsequently, the laser beam 400 may be irradiated from the light blocking member 212 toward the first pixel region in a scanning manner so as to diffuse light blocking member particles 212'. When the laser beam 400 is irradiated toward the center of the microcavity 502 from each of the left light blocking member and the right light blocking member in the first pixel region, the light blocking member particles 212' may also be leaked from the light blocking member 212 and diffused toward the center of the first pixel region in a plane.

Referring now to FIG. 15, a blackening member 212" may be formed by expanding the area of the light blocking member 212 in the first pixel region (the left region in the drawing). The blackening member 212" may include a light blocking member (not shown) overlapped with the data line, and a light blocking member (not shown) formed by hardening or semi-hardening light blocking member particles 212' and overlapped with an aperture region. The blackening member 212" may be overlapped with the first pixel region so as to substantially block light penetrating through the first pixel region. Thus, the first pixel region 12B, which represented a blue color, may always represent a black color, thereby blackening the first pixel region 12B.

In the present embodiment, the color filter 222 and the light blocking member 212 are disposed on the second substrate which is an upper substrate so as to simplify processes and prevent defects which might occur when the color filter is disposed on a thin film transistor substrate (i.e., first substrate) which has multiple micro wirings and patterns formed therein, thereby maintaining high yield rate.

The blackening member 212" may be formed without causing any physical/chemical damage to the color filter, and thus defects which might be caused by foreign substances generated by a decomposition of the color filter can be prevented, and pixel regions representing different colors can be blackened using the laser beam having the same wavelength range.

Figure 16:
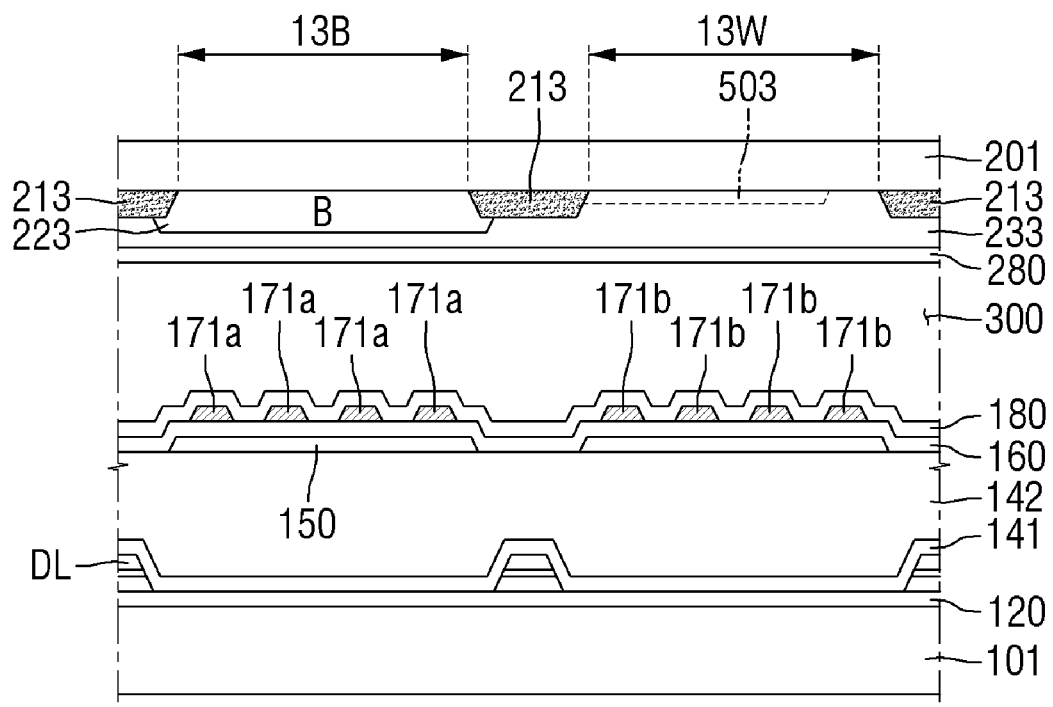
FIG. 16 and FIG. 17 are cross-sectional views of another embodiment of a liquid crystal display device.
Figure 17:
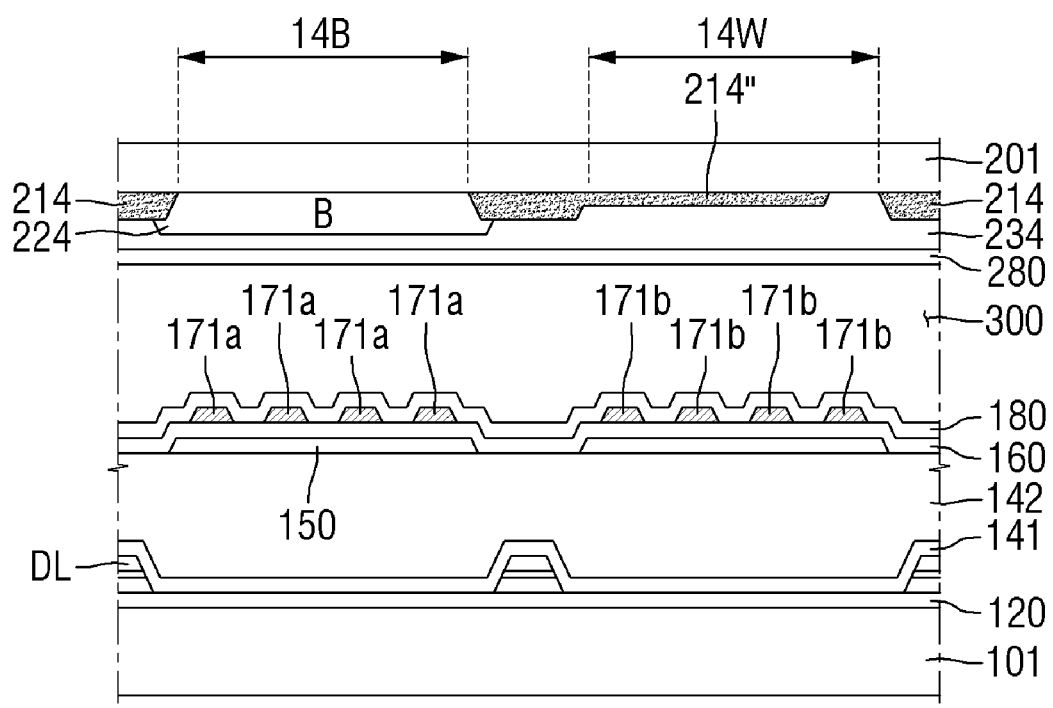

FIG. 16 and FIG. 17 are cross-sectional views of a liquid crystal display device according to some other embodiments.

Referring to FIG. 16, the liquid crystal display device according may include a microcavity 503 formed in an overcoat layer 233 adjacent to the second base substrate 201 in a second pixel region 13W. The microcavity 503 of the present embodiment may have a planar area overlapped with only a part of the second pixel region 13W.

Referring to FIG. 17, the liquid crystal display device may include a blackening member 214" formed by expanding the area of the light blocking member in a second pixel region 14W. The blackening member 214" may include a light blocking member (not shown) overlapped with the data line, and a light blocking member (not shown) formed by hardening or semi-hardening light blocking member particles and overlapped with an aperture region. The blackening member 214" of the present embodiment may have a planar area overlapped with only a part of the second pixel region 14W.

In the event that complete blackening is not required due to characteristics of a liquid crystal display device, the blackening member 214" may be formed only in a part of a defective pixel region so as to achieve substantial blackening and minimize processing performed on the light blocking member overlapped with the data line.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A liquid crystal display device comprising:
   a substrate;
   a first light blocking unit disposed on the substrate and configured so as to divide a plurality of pixel regions including a first pixel region and a second pixel region, a lower surface of the first light blocking unit directly contacting the substrate;
   a second light blocking unit disposed on the substrate, a lower surface of the second light blocking unit directly contacting the substrate;
   a color filter disposed in the first pixel region and on the substrate; and
   an overcoat layer which is disposed on the substrate, the first light blocking unit, the second light blocking unit, and the color filter, and which comprises a material which is capable of absorbing ultraviolet light of a wavelength range from 200 nanometers to 400 nanometers;
   a first pixel electrode disposed in the first pixel region, the first pixel electrode overlapping the color filter; and
   a second pixel electrode disposed in the second pixel region,
   wherein an upper surface of the first light blocking unit and an upper surface of the second light blocking unit directly contact the overcoat layer,
   wherein a thickness of the first light blocking unit measured from the lower surface of the first light blocking unit to the upper surface of the first light blocking unit in a direction perpendicular to an upper surface of the substrate is greater than a thickness of the second light blocking unit measured from the lower surface of the second light blocking unit to the upper surface of the second light blocking unit in the direction perpendicular to the upper surface of the substrate,
   wherein the second light blocking unit is disposed in the second pixel region and the second light blocking unit overlaps the second pixel electrode, and
   wherein the second pixel electrode does not extend beyond the second light blocking unit in a direction from the second light blocking unit to a portion of the first light blocking unit directly contacting the second light blocking unit.

2. The liquid crystal display device of claim 1, wherein the material capable of absorbing ultraviolet light of a wavelength range from 200 nanometers to 400 nanometers comprises a conjugated compound, an allene compound, an alkyne compound, a thioether group-containing compound, a carbonyl compound, an ester group-containing compound, an imine group-containing compound, an azo compound, a nitroso group-containing compound, a ketene compound, or a combination thereof.

3. The liquid crystal display device of claim 1, wherein the material capable of absorbing ultraviolet light of a wavelength range from 200 nanometers to 400 nanometers is a product of an overcoat composition for forming the overcoat layer, wherein the material is contained in the overcoat composition in a range of 0.001 weight percent to 10 weight percent.

4. A liquid crystal display device comprising:
   a first substrate;
   a first light blocking unit disposed on the first substrate so as to divide a plurality of pixel regions including a first pixel region and a second pixel region, a lower surface of the first light blocking unit directly contacting the first substrate;
   a second light blocking unit disposed on the first substrate, a lower surface of the second light blocking unit directly contacting the first substrate;
   an organic layer which is disposed on the first substrate, the first light blocking unit, and the second light blocking unit, and which comprises a material which is capable of absorbing ultraviolet light of a wavelength range from 200 nanometers to 400 nanometers;
   a first pixel electrode disposed in the first pixel region; and
   a second pixel electrode disposed in the second pixel region,
   wherein an upper surface of the first light blocking unit and an upper surface of the second light blocking unit directly contact the organic layer,
   wherein a thickness of the first light blocking unit measured from the lower surface of the first light blocking unit to the upper surface of the first light blocking unit in a direction perpendicular to an upper surface of the first substrate is greater than a thickness of the second light blocking unit measured from the lower surface of the second light blocking unit to the upper surface of the second light blocking unit in the direction perpendicular to the upper surface of the first substrate,
   wherein the second light blocking unit is disposed in the second pixel region and the second light blocking unit overlaps the second pixel electrode, and
   wherein the second pixel electrode does not extend beyond the second light blocking unit in a direction from the second light blocking unit to a portion of the first light blocking unit directly contacting the second light blocking unit.

5. The liquid crystal display device of claim 4, wherein the material capable of absorbing ultraviolet light of a wavelength range from 200 nanometers to 400 nanometers comprises a conjugated compound, an allene compound, an alkyne compound, a thioether group-containing compound, a carbonyl compound, an ester group-containing compound, an imine group-containing compound, an azo compound, a nitroso group-containing compound, a ketene compound, or a combination thereof.

6. The liquid crystal display device of claim 4, wherein the material capable of absorbing ultraviolet light of a wavelength range from 200 nanometers to 400 nanometers is a product of an organic layer composition for forming the organic layer, wherein the material is contained in the organic layer composition in a range of 0.001 weight percent to 10.0 weight percent.

7. The liquid crystal display device of claim 1, wherein the second light blocking unit does not directly contact the color filter.

\* \* \* \* \*